United States Patent
Mao et al.

(10) Patent No.: US 6,391,454 B1
(45) Date of Patent: May 21, 2002

(54) CONTROLLED RELEASE UREA-BASED PRODUCTS

(75) Inventors: Lijun Mao, Murrieta; Xiaoming Yang, San Diego; Robert J. Petcavich, Del Mar, all of CA (US)

(73) Assignee: Agway Inc., DeWitt, NY (US)

( * ) Notice: Subject to any disclaimer, the term of this patent is extended or adjusted under 35 U.S.C. 154(b) by 0 days.

(21) Appl. No.: 09/527,374

(22) Filed: Mar. 16, 2000

Related U.S. Application Data

(63) Continuation-in-part of application No. 09/286,931, filed on Apr. 6, 1999, now abandoned.

(51) Int. Cl.$^7$ ............................................. A01N 25/26
(52) U.S. Cl. ................... 428/407; 71/64.07; 71/64.11; 71/64.13
(58) Field of Search ................. 428/407; 71/64.11, 71/64.07, 64.13

(56) References Cited

U.S. PATENT DOCUMENTS

| | | |
|---|---|---|
| 3,264,089 A | 8/1966 | Hansen |
| 3,295,984 A | 1/1967 | Hansen |
| 3,617,298 A | 11/1971 | Kohl ............................ 99/2 |
| 3,736,146 A | 5/1973 | Milligan et al. ................. 99/2 |
| 3,873,733 A | 3/1975 | Moore .......................... 426/69 |
| 3,873,734 A | 3/1975 | Higgins et al. ............... 426/69 |
| 3,940,493 A | 2/1976 | Fox .............................. 426/69 |
| 3,962,161 A | * 6/1976 | Trapasso ...................... 526/12 |
| 3,997,627 A | * 12/1976 | Ichimura et al. ............ 260/862 |
| 3,998,979 A | * 12/1976 | Armstrong et al. ........... 427/54 |
| 4,393,082 A | 7/1983 | White et al. .................... 436/2 |
| 4,711,659 A | 12/1987 | Moore ........................... 71/93 |
| 4,772,490 A | 9/1988 | Kogler et al. ............... 427/212 |
| 4,804,403 A | 2/1989 | Moore ........................... 71/28 |
| 4,880,455 A | 11/1989 | Blank ............................ 71/28 |
| 4,969,947 A | 11/1990 | Moore ........................... 71/28 |
| 4,970,117 A | 11/1990 | Durdevani et al. ......... 428/334 |
| 4,979,980 A | 12/1990 | Thaler et al. ............... 71/64.02 |
| 4,988,377 A | 1/1991 | Manalastas et al. ........... 71/28 |
| 5,072,039 A | 12/1991 | Worsley ...................... 564/60 |
| 5,211,985 A | 5/1993 | Shirley, Jr. et al. ......... 427/213 |
| 5,538,531 A | 7/1996 | Hudson et al. |
| 5,547,486 A | 8/1996 | Detrick et al. |
| 5,733,590 A | 3/1998 | Holladay ..................... 426/69 |
| 5,803,946 A | 9/1998 | Petcavich et al. .......... 71/64.11 |
| 6,299,913 B1 | * 10/2001 | Block et al. ................... 426/2 |

FOREIGN PATENT DOCUMENTS

| | | |
|---|---|---|
| EP | 0520456 A1 | 12/1992 |
| EP | 0661250 A1 | 7/1995 |
| EP | 0867422 A2 | 9/1998 |

OTHER PUBLICATIONS

"Controlled Release Fertilizers", Dr. Robert Powell, Noyes Development Corporation, 1968, pp. 169–174.
"Developing a Biodegradable Film for Controlled Release of Fertilizer", Plastics Engineering, Jan. 1994, pp. 19–21.
"Modified Rosin–Parafin Wax Resins as Controlled Delivery Systems for Fertilizers, Fabrication Parameters Governing Fertilizer Release in Water." Ind. Eng. Chem. Res., vol. 33, No. 6, 1994, pp. 1623–1630.
Berry, W.T., J.K. Riggs and H.O. Kunkel, 1956. The Lack of toxicity of biuret to animals. J. Animal Sci. 15:225.
"A Study of the Slow Release of Urea From Microcapsules with TDI as the Wall–Sealing Treatment", 19–Fert., Soils, Plant Nutr., vol. 104, 1986, Abstract 104: 224181.
The Comprehensive Resource for Polyurethanes, Dow Plastics, 1994.
"Specialty MDI Isocyanates with FDA Approval", (Rubinate), ICI Polyurethanes Group, ICI Americas, Inc.
"Principles of Polyurethane Chemistry and Special Applications", Dieterich et al, Polyurethane, pp. 11–16.
Belasco, I.J. 1954, New nitrogen feed compounds for ruminants–a laboratory evaluation. J. Animal. Sci. 13:601.
Belasco, I.J. 1954, Comparison of urea and protein meals as nitrogen sources for rumen microorganisms: urea utilization and cellulose digestion. J. Animal Sci. 13:78.
Bradley, N.W., B.M. Jones, Jr., G.E. Mitchell, Jr., and C.O. Little. 1966. Fat and urea in finishing rations for steers. J. Animal Sci. 25:480.
DuPont, 1958. Digest of research on urea and ruminant nutrition. Polychemicals Department, E.I. DuPont De Nemours & Company (Inc.), Wilmington 98, Delaware.
Johnson, R.R. and K.E. McClure, 1964. In vitro and in vivo comparisons on the utilization of urea, biuret and diammonium phosphate by sheep. J. Animal Sci. 23:208.
Meiski, J.C., W.J. Arsdell, R.W. Luecke and J.A. Hoefer. 1955, The utilization of urea and biuret as sources of nitrogen for growing–fattening lambs. J. Animal Sci. 14:941.
N.R.C. 1985. Daily Nutrient Requirements of Sheep, Table 1 Nutrient Requirements of Sheep National Research Council, Washington, D.C.
Feedstuffs, Oct. 7, 1985, p. 25.

* cited by examiner

Primary Examiner—Hoa T. Le
(74) Attorney, Agent, or Firm—Hodgson Russ LLP

(57) ABSTRACT

Controlled release urea-based feed supplements for ruminant animals and controlled release urea-based plant nutrients are comprised of particles or granules comprised in whole or in principal part of urea or having urea at or on the exterior surfaces thereof, and a moisture resistant interpenetrating polymer network coating on the particles comprised of the reaction products of urea and a polyisocyanate, and the reaction products of polyisocyanate, an alkyd resin having at least one double bond in each repeat unit and an oil having at least one double bond, the double bonds being reactive with one another and with themselves. The coated plant nutrients have a substantially linear rate of release of nutrients to the soil over a controlled period of time, e.g., 30 to 120 days. The coated ruminant feed supplements have a substantially linear rate of NPN release in the rumen over a controlled period of time, e.g., 12 to 24 hours. The ratio of nutrients to control agents is high, controlled release is achieved at minimal expense, and the products are economical to use.

20 Claims, No Drawings

CONTROLLED RELEASE UREA-BASED PRODUCTS

CROSS REFERENCE

This application is a continuation-in-part of copending application Ser. No. 09/286,931 filed Apr. 6, 1999 now abandoned.

FIELD OF THE INVENTION

The present invention relates to urea-based products that are released over a controlled period of time and to methods of making the same. The invention is particularly concerned with controlled release urea-based feed supplements for animals and controlled release urea-based plant nutrients.

BACKGROUND OF THE INVENTION

Urea in particulate form is an excellent and economical source of nitrogen to stimulate plant growth. Unfortunately, it is rapidly soluble in water. In spring rains, for example, the water soluble plant nutrient is quickly flushed away thereby (a) depleting its efficacy as a plant food, (b) potentially causing phytotoxicity to the plants, and (c) causing the nutrients to migrate to and contaminate the ground water and local wells and streams.

Researchers have for a long time attempted to develop particles which release nutrients at a rate about equal to their uptake by plants to minimize phytotoxicity and maximize use efficiency. Improved release control has been achieved primarily with nitrogen in the form of urea by substantially reacting it with aldehydes to form insoluble products such as ureaform, which must chemically decompose in the soil before nitrogen becomes available for utilization by plants. Another method consists of physically coating fertilizer granules with solidified water insoluble melts. Various materials have been used as coatings, including sulphur, paraffin waxes, vegetable oils and plastics. These coatings must be broken down by erosion, internal vapor pressure, microbes, or attrition before the contained nutrients become available.

Urea in particulate form is also an excellent and economical source of non-protein nitrogen (NPN) for use as a supplement in the feeding of ruminant animals, e.g., cows, cattle, sheep, goats, etc. Microorganisms found in the rumen or first stomach of ruminants allow the animal to manufacture protein amino acid from simple nitrogen compounds. Apparently, non-protein nitrogen compounds such as urea are first converted to ammonia through the action of enzymes produced by the rumen microorganisms, which then utilize the ammonia to synthesize protein amino acids which can be digested by the ruminant's digestive system.

The ability of ruminants to utilize NPN compounds as indirect protein sources has important economic consequences. One pound of urea is equivalent in nitrogen content to over five pounds of a high protein feed such as soybean meal. On the basis of relative cost per unit of nitrogen, soybean meal is an order of magnitude more costly than urea. As a consequence, there is a strong incentive to replace a portion, or even all, of the vegetable protein fed to ruminants with NPN compounds.

Unfortunately, the amount of NPN compound that a ruminant can ingest is quite limited. The ammonia produced during post-feeding fermentation, when the NPN compound is decomposed, can be transferred to the blood stream across the rumen wall. When high levels of blood ammonia occur, the acid base balance of the blood changes and the central nervous system is affected. Early toxic systems are bloat, incoordination, labored breathing and excessive salivation; in extreme cases, there may be convulsions and death.

Various attempts have been made to limit the ammonia concentration in the rumen so as to permit the use of more NPN compound in the daily ration. Among these are several proposals for compounding or mixing urea with some kinds of water insoluble polysaccarides and/or reacting the urea in the manners above described to provide for controlled release of NPN into the rumen at rates that can be tolerated by the animal.

U.S. Pat. Nos. 3,873,733 and 4,393,082 are representative of prior developments in controlled release ruminant feed supplements, and U.S. Pat. Nos. 4,711,659 and 4,804,403 are representative of prior developments in controlled release plant nutrient formulations.

While some degree of commercial success has been achieved in respect of both plant nutrients and ruminant feed supplements, development of urea-based nutrient products that are insoluble in water, saliva and gastric juices and that have better performing time controlled rates of release remain a high priority.

U.S. Pat. No. 5,803,946, issued Sep. 8, 1998 to the assignee of the instant application, discloses controlled release plant nutrients comprising urea based particulates the surfaces of which have been transformed into a water resistant, biodegradable interpenetrating polymer network. The interpenetrating polymer network is comprised of a biuret, a urethane and tung oil interlinked one with another. The biuret is a reaction product of urea on the surface of the nutrient particles and a polyisocyanate, and the urethane is a reaction product of the polyisocyanate and an alcohol. The tung oil is cross-linked into the network by reaction with the urethane, preferably in the presence of a cross-linking initiator or promoter.

SUMMARY OF THE INVENTION

The object of the invention is to provide more reliable and better performing urea-based products having a controlled rate of release over a preselected period of time. The application is generally applicable to particulates comprised in whole or in principal part of urea and/or to particulates having urea at or on the exterior surfaces thereof, irrespective of use. However, the invention is concerned primarily with more reliable and better performing controlled release plant nutrients and controlled release NPN feed supplements for ruminant animals.

More specific objects of the invention are to provide (a) a urea based plant nutrient having a substantially linear rate of nutrient release in soil over a prolonged period of time, e.g., 30 to 120 days, and (b) a urea based ruminant feed supplement having a linear rate of NPN release in the rumen over a twelve to twenty-four hour period of time.

In accordance with the invention, improved performance is achieved by transforming the surfaces of urea based particulates into an interpenetrating polymer network coating comprised of the reaction products of urea and a polyisocyanate and the simultaneous condensation polymerization and free radical polymerization of the isocyanate, an alkyd resin having a double bond in each repeat unit and an oil, e.g., dehydrated castor oil or tung oil, having double bonds reactive with the alkyd resin double bonds and with themselves.

A three-dimensional interpenetrating polymer network shell is thus formed on the particulates at a very high level of three-dimension crosslinking density. A hydrophobic exterior protective layer is provided by alkyl chains, and offers additional water barrier properties. An optional wax overcoat may be employed to enhance handling strength.

In the resultant coating, all of the constituents are chemically bonded together and chemically bonded to the surfaces of the particles, thereby providing more reliable and better performing products.

The surfaces of the resultant particles are hard, tough, resistant to shock and abrasion, uniform, dustless and non-tacky. The particles form free-flowing, essentially dustless and convenient to use urea-based products.

In the end products, the ratio of nutrients to control agents is extremely high, the controlled release is achieved at minimal expense, and the products are economical to use. In addition, the method of producing the products is economical, practical and facile.

The method may be carried out either separately from or as the final step in the urea manufacturing process, either as a continuous in-line process or a batch process. In accordance with the invention, the urea particulates are fed into a suitable apparatus, e.g., a rotary mixer, a coating drum, a fluidized bed, or the like, for creating a mobile mass of the particles within which the particles are moved in a free-falling curtain or a tumbling or rolling motion so that each particle is from time to time exposed at the surface of the mass for application thereto of a liquid or fluent polyisocyanate and a liquid or fluent mixture of alkyd resin, oil, a free radical initiator and a catalyst and/or promotor to cause the surfaces of the particles to be transformed into the interpenetrating polymer network coating above described. The method is very efficient and inexpensive to practice and produces an economical controlled release urea based product having the characteristics and features desired by industry.

These and other objects, features and advantages of the invention will become apparent to those of reasonable skill in the art from the following detailed description.

DETAILED DESCRIPTION OF THE BEST MODE OF CARRYING OUT THE INVENTION

The following is a detailed description of preferred embodiments of the invention presently deemed by the inventors to be the best mode of carrying out the invention.

The invention in its preferred embodiments is employed to control the release time of nutrients comprised in whole or in principal part of urea. However, the starting material may be any chemical or chemical compound or compounds comprised of discrete particles or granules having urea at or on the exterior surface thereof. As used hereinafter, the term "urea" is defined as including these variations.

In practice of the invention, the particles should preferably have a high degree of uniformity or regularity and a low surface area per unit of weight. Particles of uniform shape and size and having a low surface area to weight ratio are generally recognized to be the most efficiently coated with the least amount of coating materials.

The method of the invention can be carried out effectively by creating a mobile mass of particulates in any one of a variety of devices including rotary mixers, rotary drums, fluidized beds, rotary pans, falling film contactors, conical blenders, and agitated conveyers. The devices impart mobility to the particles and induce a rolling, tumbling or free-falling movement of the particles in the mass, so that the surfaces of each particle are at least periodically exposed for topical application thereto of a material, e.g., a coating material, which may be applied to the particles in liquid, fluent or powder form by pouring, spraying or mixing.

Drum and pan coating devices are used extensively in various industrial processes and lend themselves well to the processing of particulate materials, in both continuous in-line processes and batch processes.

In accordance with the invention, a mobile mass of particles is treated with a polyfunctional isocyanate which reacts with the urea on the surface of the particles to form a biuret, i.e., a condensation product of urea with isocyanate. The reaction, which may be expressed

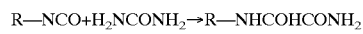

allows the isocyanate group to form a chemical bond on the urea surface. This reaction increases adhesion between the coating and the particulate substrate and provides a first water barrier on the urea granule surface.

The amount of polyisocyanate applied to the particles is in excess of that required to react with the urea containing surfaces of the particles, the excess being sufficient to support the next described reaction and preferably being in the order of from about 5 to 10 times, and more preferably 6 to 8 times, more than the amount required to transform the surface of the particles into a biuret. Polyisocyanates preferred for practice of the invention are polymeric diisocyanates having more than two functional groups, preferably polymeric diphenyl methane diisocynate (MDI) and polymeric hexamethylene dilsocyanate (HDI). Other acceptable isocyanates are aliphatic or aromatic, linear or branch, substituted or non-substituted, saturated or nonsaturated isocyanates with more than two isocyanate functional groups.

The MDI may be PAPIT™ 2027 polymeric MDI from The Dow Chemical Co., or Rubinate™ M polymeric MDI from ICI Polyurethanes, or MONDUR™ MR-200 polymeric MDI from Bayer, Inc. The HDI may be DESMODUR™ polymeric HDI XP7100, N3300 or N75BA from Bayer, Inc. Monomer HDI, such as Bayer's DESMODUR™ H, is also useful in practice of the invention. The polymeric diisocyanate should have a functionality within the range of from more than 2.0 to about 3.5, and an —NCO content within the range of from about 15% to about 35%.

To facilitate the reaction of the polyisocyanate with the urea, a tin catalyst, such as T1 or T12 available from Air Products Co., or a zinc catalyst, such as BiCat Z available from The Shepherd Chemical Company, or a bismuth catalyst, such as BiCat V from Shepherd may be employed. The catalyst is particularly recommended when using HDI.

After the polyisocyanate or a mixture of polyisoyanate and catalyst has been applied to the mobile mass of urea particles or granules, a second coating comprising a mixture of an alkyd resin having double bonds, an oil having double bonds, a catalyst, and an initiator is applied to the mobile mass of particles or granules. The mixture may optionally include a promoter and/or a diluent or solvent. The preferred oils are dehydrated castor oil and tung oil. The alkyd resin is a compound containing hydroxyl and carbonyl groups as well as double bonds. The hydroxyl group can react with the isocyanate group to form polyurethane, and the double bonds can have free radical polymerization with the oil and itself. The double bonds appear in each repeat unit and can be in a branch chain or the backbone.

The chemical structure of the alkyd resin is:

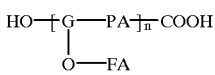

Where: n is the degree of polymerization,
G is monoglyceride having the structure

PA is polybasic acid having the structure HOOC - - - COOH
FA is tall oil having the structure HOOCR' and comprised of 46% Oleic $HOOC(CH_2)_8CH=CH(CH_2)_6CH_3$
41% Linoleic $HOOC(CH_2)_7CH=CHCH_2CH=CH(CH_2)_4CH_3$
13% other fatty acid.

The coating mixture of alkyd resin, oil, initiator, catalyst, and optionally, promoter and/or solvent starts to cure immediately upon application to the granules. The excess of isocyanate applied to the granules in the first coating step or stage reacts with the —OH and —COOH in the alkyd resin and the —COOH in the oil, according to condensation polymerization reactions:

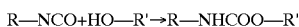

Free radical polymerization of the alkyd resin and the oil take place simultaneously with the condensation polymerization of the excess isocyanate, alkyd resin and oil. The double bonds in the alkyd resin can also react with the double bonds in the oil, thereby to form a simultaneous interpenetrating polymer network coating on the particles, wherein all of the constituents, including the oil, are chemically bonded together and to the particulates.

The free radical polymerizations of the alkyd resin and the oil may be expressed as follows:

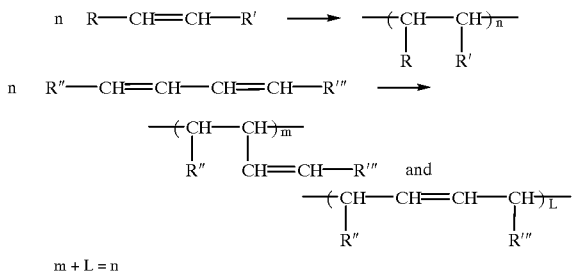

wherein R', R", R'" are alkyl chains. The R—CH=CH—R' and R"—CH=CH—CH=CH—R'" can also react with each other to form a crosslink polymer. This reaction allows a cage to form a three dimension bond between the alkyd resin and the oil, which in turn promotes the formation of a three dimensional interpenetrating polymer network shell of high cross linking density on each of the urea particles or granules.

One alkyd resin preferred for practice of the invention is Dynotal™ T-39-EMP from Cytec Industries, Inc., West Paterson, N.J. The acid value in mg KOH/g solids is 8–30, the HO-value in mg KOH/g solids is 155–160, and viscosity at 23° C. is 2500–3500 mPas. Another alkyd resin preferred for practice of the invention is 7482 short oil alkyd resin available from Ohio PolyChem, which contains 10% PMA, and has an acid number of 19 and a viscosity of V-X. Alkyd resins having a higher viscosity, e.g., 3500–9000 mPas at 23° C., may be employed to impart enhanced physical properties to the coating, such as film tensile strength. One example is Dynotal™ T-49-EMP with a viscosity of 6000–9000 mPas at 23° C. However, use of resins of very high viscosity will usually require a prime coating of wax on the urea granules and the use of a diluent or solvent to reduce viscosity during application of the coating mixture to the granules.

Oils other than tung oil and dehydrated castor oil, having double bonds reactive with the double bonds in the alkyd resin may suitably be employed, e.g., linseed oil, sunflower oil, tall oil and safflower oil. However, dehydrated castor oil and tung oil are preferred because they are nontoxic and safe for consumption by animals, dry rapidly and, by virtue of their long chain hydrocarbon backbones, impart flexibility to the coating.

An initiator is employed in the alkyd resin/oil mixture to initiate free radical polymerization of the mixture. While not emphasized above, a catalyst and/or a polymerization promoter are optional and preferred constituents of the coating mixture to increase the speed of the reactions and thereby minimize the coating cure time. The initiator may be selected from ketone peroxides, such as methyl ethyl ketone peroxide, benzoyl peroxide and cumene hydroperoxide. A presently preferred initiator is available under the trade name DDM from elf autochem. The promoter may be a metal or metal compound, such as cobalt or vanadium. Also, a catalyst, such as tin, zinc, iron, lithium, bismuth, potassium compound and amine, may be employed. Suitable tin catalysts are $T_{12}$ and $T_1$ from Air Products. A suitable zinc compound is BiCat Z from Shepherd. A suitable bismuth catalyst is BiCat V, also from Shepherd. A suitable amine catalyst is triethylenediamine, such as Amicure™ 33-LV from Air Products. In formulas where HDI is used, one of the above catalysts must be used.

Depending upon the viscosity of the second stage coating mixture, a diluent or solvent may or may not be required. For example, if the second stage mixture is applied hot, e.g., at a temperature of up to about but not in excess of 50° C. (122° F.), viscosity may be controlled solely by adjustment of the temperature of application. If the second stage mixture is not heated or not sufficiently heated, or viscosity cannot be reduced by heat alone, a solvent selected from glycol ethers, such as propylene glycol methyl ether acetate (PM acetate), ketones, such as methyl ethyl ketone (MEK), and aromatic hydrocarbons may be added to the mixture in an amount sufficient to reduce the viscosity to the desired consistency for application to the mobile mass of granules or particles.

After the second stage coating mixture has cured, an optional third stage coating may be applied if needed to satisfy prolonged nutrient release requirements or to meet other physical or aesthetic criteria. The third stage coating comprises a wax, preferably paraffin wax having a high degree of linearity and crystallinity, and a melting temperature of 52–83° C. (126–181° F.). One example is a paraffin wax available from Lawter International, Inc., Kenosha, Wis. The wax serves primarily to seal pinholes and fissures in the previously formed interpenetrating polymer network coating, thereby to aid in controlling the rate of release of nutrients from the coated nutrient particles or granules.

The reactions above described complete the formation of a water insoluble interpenetrating polymer network coating on the surface of the nutrient particles, or perhaps more accurately, the transformation of the exterior of the particles into a coating comprising an interpenetrating polymer network that is insoluble in water, saliva and gastric juices, but sufficiently degradable to release the nutrient, i.e., to permit the nutrient to be leached out through the coating, over a period of time.

In one form of practice of the invention, the urea or urea bearing granules or particles are fed to a coater and dried for about 10 to about 40 minutes at 60–100° C. (140–212° F.). Liquid isocyanate, or a mixture of isocyanate and one or both of a catalyst and a diluent, is then applied to the mobile mass of particles in an amount that is from about 5 to about 10 times, preferably 6–8 times, greater than the amount required for the reaction between the isocyanate and the urea, and held for a residence time of about 5 minutes to uniformly coat the particles and to permit the isocyanate/urea reaction to be completed. A liquid or fluent mixture of alkyd resin, oil, initiator, catalyst and, optionally, promoter and/or solvent is then applied to the particles. To expedite the reactions and hasten the cure time, the particles and the coating constituents are preferably heated to and/or maintained at an elevated temperature in the order of about 40–100° C., preferably about 45–75° C. At these temperatures, and with reasonable proportions of the initiator and catalyst, cure times are in the order of 5 to 10 minutes.

The proportions of the constituents applied to the nutrient particles to form the interpenetrating polymer network coating are preferably in the order of from about 15% to about 45% by weight of the isocyanate, from about 20% to about 60% by weight of the alkyd resin, about 5% to about 35% by weight of the oil, and from about 0.05% up to about 10% by weight of initiator and promoter. If required, a solvent may be used in a proportion of up to about 40%.

More preferred ranges of the constituents are about 20–40% by weight of the isocyanate, 25–60% by weight of the alkyd resin, 5–25% by weight of the oil, 0.05–6% initiator and 3–35% solvent. The ratio of alkyd resin to oil is preferably within the range of about 7:5 to about 9:1. For low viscosity resins, e.g., Dynotal™ T-39-EMP, the preferred ranges of the constituents are 20–40% by weight of the isocynate, 30–55% by weight of the alkyd resin, 5–20% by weight oil, and the initiator and solvent.

The polymer network forming ingredients may be applied to the nutrient particles in coat weight amounts comprising from about 2% to about 5%, more preferably 3% to 4%, and most preferably about 3% by weight of the treated urea particles. Coat weight is based only on the dry polymer network. Solvent, initiator, catalyst and wax are not included. A 3% coat weight means there are three parts polymer coating to 100 parts urea. After the polymer network has cured, the particles are preferably overcoated with paraffin wax in an amount of from about 0.5% to about 2.0%, preferably about 1% by weight of the nutrient particles.

Application to urea granules of a coating comprised of about 3% by weight of the interpenetrating polymer network coating and 1% by weight of paraffin wax produces a nutrient nitrogen product having a substantially linear rate of release to soil of about 82% over 210 days and a substantially linear rate of total consumption in ruminants (cows) over a period of 24 hours.

The rate of nitrogen release to soil was determined experimentally according to an accepted laboratory technique wherein 10 grams of coated urea is immersed in 100 cc of cold water over a number of days (in this case 30 days) and the release rate and pattern observed and recorded by standard test procedures. Based on comparative tests, one day in water is approximately equivalent to one week in soil.

The rate of NPN release in ruminants was determined by extracting comparative samples from the rumens of fistulated milk cows fed rations respectively including and not including the coated urea, and by taking periodic jugular blood samples from the same cows. The tests established that the coated urea of the invention, even when fed at significantly higher rates than would be normal, i.e., up to ten times normal, was totally non-toxic to the animals. The comparative tests further established an increase in bacterial activity in the rumen, and significant increases in milk production and the butter fat content of the milk produced by the cows fed rations including the coated urea of the invention.

Heretofore, the maximum daily dosage of urea that could safely be fed cows was one-eighth of a pound a day; one-sixteenth of a pound twice daily. The daily dosage can now easily and safely be quadrupled to one-half pound per day without toxic effect. Considering that urea on a per pound basis provides five times as much NPN as soybean meal, merely doubling the urea in the ration to one-quarter pound per day would reduce by one and one-quarter pounds the amount of soybean meal required in the ration. At 1998–1999 prices, this would reduce the feed cost (depending on geographic location).by about 10 to about 30 cents per day per cow. If the coated urea content were increased to one-half pound per day, the savings would be twice as much. Moreover, cows fed the coated urea produce (a) more milk having (b) a higher butter fat count, and therefore a more valuable commodity than the milk from cows not fed the coated urea. These are significant economic consequences in the dairy industry.

In a specific example, cows fed a feed supplement including a half pound per day (one-quarter pound twice daily) of the controlled release coated urea of the invention, and two and one-half pounds less of soybean meal, had increased milk production of eight pounds per day, and the milk produced had a 10–20% increase in butter fat content and a notable improvement in protein content. Also, the amount of animal excrement appeared to be reduced.

Representative examples of the constituents, by weight/weight percent, of polymer network coatings employing polymeric MDI and a low viscosity alkyd resin, e.g., Dynotal™ T-39-EMP are set forth in Table 1.

TABLE 1

| MDI | 30 | 30 | 37 |
| T-39-EMP | 41 | 53 | 37 |
| Dehydrated Caster Oil | 18 | 6 | 15 |
| Solvent (acetate) | 6 | 6 | 6 |
| Initator | 5 | 5 | 5 |

In the case of polymer networks utilizing high viscosity alkyd resins. e.g., having a viscosity of 6000–9000 mpas at 23° C., a prime coat of paraffin wax is preferably applied to the urea particles prior to application of isocyanate. At a processing temperature of from about 50° C. to about 100° C., the wax appears to act as a, lubricant or solvent for the higher viscosity alkyd resin and aids in even distribution of the resin over the particles. Also, the viscosity of the resin is preferably reduced by addition to the alkyd resin/oil mixture of from about 12 to about 22% by weight of an acetate, preferably PM acetate.

A high viscosity alkyd resin coating system for urea particles preferably consists of a 1% by weight prime coat of wax, a 2 to 5% by weight interpenetrating polymer network coating, and a 1% by weight overcoat of wax.

Representative examples of polymer network coating constituents employing polymeric MDI. and a high viscosity alkyd resin, e.g., Dynotal™ T-49-EMP are, by weight percent:

TABLE 2

| MDI | 28 | 35 |
|---|---|---|
| T-49-EMP | 28 | 35 |
| Castor Oil | 15 | 12 |
| Solvent | 28 | 17 |
| Initiator | 0.5 | 0.5 |

A representative example of a coating formulation employing polymeric HDI and a low viscosity alkyd resin is, by weight percent:

TABLE 3

| HDI | 30.7 |
|---|---|
| Catalyst T12 | 0.012 |
| PM acetate | 8.4 |
| Alkyd resin (T-39-EMP) | 33.1 |
| Tung or Dehydrated Castor Oil | 7.1 |
| Initiator DDM-9* | 0.24 |
| Benzoyl peroxide | 0.071 |
| Catalyst T12 | 0.47 |
| Wax (optional) | 23.6 |
| Brix reading | 0 |

The polymeric HDI, catalyst T12 and PM acetate solvent comprise a first coating mixture for application to the urea granules. The HDI may be any of Bayer's N3300, N75BA, and XP7100. In the above formula, N3300 is preferred. HDI N3300 has an NCO content of 21.3 to 21.8%, a viscosity of 1800–4000 mPas at 25° C., and a functionality of around 3.5. The solvent, PM acetate, is recommended for use with N3300, but may not be needed with lower viscosity HDIs, such as N75BA and XP7100.

HDI N75BA has an NCO content of 16.2–16.8%, a viscosity of 90–210 mPas at 25° C., and a functionality of about 3. HDI XP7100 also has a functionality of 3, an NCO content of 20–21%, and a viscosity of 800–1200 mPas at 25° C. Both perform well in the formulation set forth in Table 3.

The alkyd resin, oil, initiator DDM and benzoyl peroxide, and additional catalyst T12 comprise a second coating mixture for application to the isocyanate treated urea granules. The preferred resin is the low viscosity T-39-EMP. Dehydrated castor oil requires higher processing temperatures than tung oil, since dehydrated castor oil has two conjugated double bonds and tung oil has three conjungated double bonds. Tung oil reacts faster than castor oil, and at lower temperatures, and is therefore usually preferred over the castor oil. The free radical co-initiator benzoyl peroxide is an optional, but preferred component in the formula.

After the polymer resin coating has cured, wax is usually added as a finishing top coat.

In Table 3, there is reference to a Brix reading of zero. The Brix reading provides an indication of the coated urea release in water as tested by a refractometer. The refractometer reading or Brix can be converted to refractive index, which is one of the most important properties of the urea water solution. Brix can also be converted to solution concentration. The test is usually done by mixing 15 grams (g) of solid material with 50 milliliters (ml) of distilled water. Test time varies from a couple of minutes to a couple of months depending upon the release rate. Brix as a function of concentration provides a calibration line from which an easy calculation can be made to obtain the percent release of urea in liquid:

$$Y \text{ (release \%)} = (A+B)X/A$$

Where A is sample weight (g), B is water amount (ml), X is the Brix, and Y is the release %

The Brix test uses the refractometer to measure the percent solids in solution. When a certain amount of urea dissolves in water, the solution Brix reflects the urea concentration. Thus, it is an easy, quick and accurate method to test the quality of coated urea. The method can also be combined with the weight loss method to produce results from both the solid and the liquid phases.

In the formulation set forth in Table 3, the need for the solvent, PM acetate, could be reduced or eliminated, and the viscosity of the coating mixture adjusted by utilizing two or more polymeric HDIs having different viscosities, e.g., by intermixing two or all three of N3300, XP7100 and N75BA to provide for viscosities intermediate the viscosity of N75BA and the viscosity of N3300, taking into consideration the difference in functionality between N75BA at 3.0 and N3300 at 3.5. Higher functionality produces higher crosslinking density, which increases water resistance.

Monomer HDI may also be used with polymeric HDI to produce highly effective urea coatings. For example, Bayer's Desmodur monomer HDI (M-HDI) added to polymeric HDI (P-HDI) N75BA, XP7100 and/or N3300 at 10% or more by weight produces a coating mixture having significantly reduced viscosity and enhanced flow characteristics, Bayer's Desmodur H has a viscosity of only 3mPas and an NCO content of 49.7%, and therefore facilitates a reduction in the amount of P-HDI in the formula, which is the most expensive constituent.

Table 4 sets forth representative examples of coating formulations comprised of P-HDI and monomeric or M-HDI.

TABLE 4

| M-HDI, Desmodur H | 7.6 | 11.6 |
|---|---|---|
| P-HDI, XP7100 | 11.6 | |
| P-HDI, N75BA | | 7.6 |
| T-12 | 0.033 | 0.033 |
| Alkyd resin (T-39-EMP) | 39.3 | 39.3 |
| Tung Oil | 7.6 | 7.6 |
| DDM-9* | 0.43 | 0.43 |
| Benzoyl peroxide (optional) | 0.099 | 0.099 |
| T12 | 0.4 | 0.4 |
| Wax (optional) | 33.0 | 33.0 |

Urea release test results for formulas using various ratios of M-HDI with P-HDI XP7100 and P-HDI N75BA are shown in Table 5.

TABLE 5

| P-HDI/ | XP7100, Brix | | | | N75BA, Brix | | | |
|---|---|---|---|---|---|---|---|---|
| M-HDI | 0.5 hrs. | 3 hrs. | 15 hrs. | 40 hrs. | 0.5 hrs. | 3 hrs. | 15 hrs. | 40 hrs. |
| 30/70 | 1 | 7.4 | 16.4 | 22.2 | 0.2 | 2.3 | 8.9 | 17.4 |
| 40/60 | 0.2 | 2.2 | 9.4 | 17.2 | 0 | 0.7 | 4.1 | 10.0 |
| 50/50 | 0.2 | 1.8 | 9 | 17.6 | 0.1 | 1.2 | 6.4 | 12.9 |
| 60/40 | 0.1 | 0.9 | 5.2 | 13.4 | 0.9 | 3.7 | 14.2 | 20.6 |
| 70/30 | 0.6 | 3.4 | 11.4 | 19.2 | 2.6 | 6.9 | 18.0 | 22.5 |
| 100/0 | — | — | — | — | 1.7 | 7.6 | 13.6 | 20.0 |

40% P-HDI N75BA with 60% M-HDI gave the best results for all of the formulas tested. For P-HDI XP7100, the best results were obtained with 60% P-HDI and 40% M-HDI. These results indicate that the monomer aids in wetting and coating of the urea surfaces. The urea flow is much better with the monomer than formulas without the monomer.

When HDI is used in the first coating or primer, the processing conditions are different than with MDI, especially the waiting period after the primer is applied. The HDI primer application time was set at 30 minutes for about 15 grams of liquid and the waiting time was tested at 2, 5, and 12 minutes. It was found that if the waiting time is longer than about 5 minutes, the HDI starts to react with the urea or itself and the urea becomes sticky and the urea flow difficult. The application time for the second coating mixture was also tested, and it was found that 5 minutes appears best.

In addition to mixtures of HDIs of different viscosities and mixtures of M-HDI with P-HDI, the invention provides additional coating characteristics and benefits through admixtures of MDI and HDI. The two different molecular structure isocyanates can be mixed and coated on urea to form a crosslinked coating. In the market at the present time, MDI is normally three times less expensive than HDI and substitution of MDI for part of the HDI produces a more economical product. A representative formula is shown in Table 6.

TABLE 6

| HDI, XP7100 | 19.7 |
|---|---|
| MDI, MR200 | 15.7 |
| Catalyst T12 | 0.03 |
| Alkyd resin T-39-EMP | 44.8 |
| Tung oil | 14.4 |
| Initiator DDM-9* | 5.0 |
| Benzoyl peroxide (optional) | 0.09 |
| Catalyst T12 | 0.3 |
| Wax (optional) | 31.3 |

Water release tests on urea coated with the Table 6 formula at a 3% coat weight show Brix readings of 0 up to 30 hours. After 30 hours, the urea starts to release. At 50 hours, the Brix was 0.2, indicating a 1% release of urea in water. At day 18, the Brix was 7.4 indicating a 32% release of urea in water. The formula thus provides a polymer network coated urea product having excellent controlled release characteristics.

In all of the polymer network compositions above described, the proper balance should be maintained between the particulates, the isocyanate, the alkyd resin and the oil to mitigate the presence of unreacted constituents in the end product. If a formulation has too low an isocyanate content, the alkyd resin and oil may not be completely reacted. If the formulation has too high an isocyanate content, the excess isocyanate will remain unreacted. Unreacted chemicals may act as impurities in the coating, specifically as unreacted hydrophilic groups that will attract moisture and speed up the rate of release of urea, which should of course be avoided or at least minimized.

Representative proportions of the constituents of the coating compositions to the urea by weight, in parts, pounds, grams or kilograms, are set forth in the following Tables 7 and 8.

TABLE 7

| Polymer Coating % | 3 | 3 | 3 | 3 | 3.5 |
|---|---|---|---|---|---|
| Urea | 100 | 100 | 100 | 100 | 100 |
| MDI | 1.0 | 1.0 | 1.2 | 1.2 | 1.5 |
| T-39-EMP | 1.4 | 1.8 | 1.2 | — | — |
| T-49-EMP | — | — | — | 1.2 | 1.5 |
| Dehydrated Castor Oil | 0.6 | 0.2 | 0.6 | 0.6 | 0.5 |
| Solvent | 0.2 | 0.2 | 0.2 | 0.9 | 0.6 |
| Initiator | 0.2 | 0.2 | 0.2 | 0.02 | 0.02 |
| Wax Optional | 1 | 1 | 1 | 2 | 2 |

TABLE 8

| Polymer Coating % | 3 | 2 | 2 | 3 |
|---|---|---|---|---|
| Urea | 100 | 100 | 100 | 100 |
| P-HDI N3300 | 1.3 | — | — | |
| P-HDI XP7100 | — | 0.35 | — | 0.63 |
| P-HDI N75BA | — | — | 0.23 | |
| M-HDI | — | 0.23 | 0.35 | |
| MDI | — | — | — | 0.5 |
| Catalyst T12 | 0.001 | 0.001 | 0.001 | 0.001 |
| T-39-EMP | 1.4 | 1.19 | 1.19 | 1.43 |
| Oil | 0.3 | 0.23 | 0.23 | 0.46 |
| Initiator DDM-9* | 0.01 | 0.013 | 0.013 | 0.16 |
| Benzoyl Perodixe (Optional) | 0.003 | 0.003 | 0.003 | 0.003 |
| PM Acetate (optional) | 0.2 | — | — | — |
| Catalyst T12 | 0.01 | 0.012 | 0.012 | 0.009 |
| Wax (optional) | 1 | 1 | 1 | 1 |

The methods or processes provided by the invention for coating or treating urea are fully compatible with conventional commercial and industrial practices. The particulate or granular urea may have the two coating mixtures applied sequentially in a single coating pan or mixer or two contiguous coating pans or mixers, and the coated granules may be cooled in the same or yet another pan or like device capable of tumbling the coated granules until they are dry. The operation may be continuous or batch by batch.

In one example, urea granules are first dried to remove moisture. The urea is then transported to a "Rollo Mixer", made by Continental Products Corporation, Milwaukee, Wis., followed by passage through a heating drum and cooling drum. In the mixer, urea is lifted at the front end of the mixer and free falls internally of the mixer in a cascading flow. This continuous free-falling curtain exposes the surfaces of the individual granules within the batch. The chemicals are then sprayed onto both sides of the curtain and, with additional mixing in the bottom part of mixer, the chemicals are uniformly dispersed over the granules. The first spray component which is primarily diisoyanate, is called the primer. It reacts with the urea to form a biuret layer which will protect the urea. In addition, this layer promotes adhesion between the urea and the dry finished coating. The second spray compound, which includes alkyd resin, oil, free radical initiator and catalyst, is then added. Just after the second compound is sprayed, the temperature is raised to 48–71° C. (120–160° F.) depending on the oil used. After the second component has been sprayed, the coated granules are transferred to a heating drum to cure. During curing, the alkyd resin is reacted with extra isocyanate groups from the first spray to form a urethane bridge. At the same time, polymerization of the double bonds in both the alkyd resin and the oil will be started by the free radical initiator. The resultant reaction is simultaneous free radical/condensation polymerization. Curing temperature is maintained at 43–71° C. Cooling of the coated urea may be done in another drum where the temperature is maintained at 38° C. (100° F.).

The urea treating or coating process of the invention is also fully compatible with conventional methods of manufacturing urea and can advantageously constitute a relatively simple add-on to the conventional urea production line. In particular, the urea particulates discharged from the conventional production line are of reasonably uniform shape and size, have a reasonably low surface area and are discharged at a temperature suitable for practice of the invention to expedite the polymer reactions and minimize the cure time.

In one given mode of commercial practice of the method, a continuous process rotary drum type coater or mixer of conventional design is added to the urea production line for reception therefrom of the hot particulates. Suitable exhaust and air make-up systems may be added as needed or desired. The rotating drum provides continuous flow-through of a mobile mass of rolling, tumbling, cascading or free falling particulates. Mounted within the drum are two or more spraying stations for applying a liquid isocyanate and a fluent mixture of alkyd resin, oil and initiator, and optionally promotor and/or solvent, to the particles in the mobile mass of particles. If desired, a spray station for spray application of a wax may also be provided before the isocyanate application station and/or after the alkyd, oil and initiator application station. The rates of spray application of coating constituents onto the mass of particulates is correlated with the volume of the mass and the transit time of the particulates through the coater to apply to the particulates the desired proportions and weights of the constituents for forming thereon an interpenetrating polymer network coating of selected weight, and if desired appropriate wax prime coats and/or overcoats. The process is continuous and performed economically and expeditiously.

The objects and advantages of the invention have therefore been shown to be attained in a convenient, practical, economical and facile manner.

While certain preferred embodiments of the invention have been herein described, it is to be appreciated that various changes, rearrangements and modifications may be made therein without departing from the scope of the invention as defined by the appended claims.

What is claimed is:

1. A controlled release product comprising particles or granules comprised in whole or in principal part of urea or having urea, at or on the exterior surfaces thereof and a moisture resistant interpenetrating polymer network coating on the particles comprised of
   the reaction product of the urea and an isocyanate reactive with the urea, and
   the reaction products of isocyanate in excess of the amount reacted with the urea, an alkyd resin, and an oil having at least one double bond.

2. A product as set forth in claim 1 wherein the isocyanate is polymeric diphenyl methane diisocyanate or monomer hexamethylene diisocyanate or polymeric hexamethylene diisocyanate or mixtures thereof.

3. A product as set forth in claim 1 wherein the alkyd resin comprises a compound containing hydroxyl and carbonyl groups and double bonds, the hydroxyl group being reactive with the isocyanate to form polyurethane, the double bonds having free radical polymerization with themselves and the oil.

4. A product as set forth in claim 1 wherein the oil is dehydrated castor oil or tung oil.

5. A product as set forth in claim 1 wherein the interpenetrating polymer network coating comprises the reaction products of constituents comprised of in the order of about 15 to 45% isocyanate, about 20–60% alkyd resin and about 5 to 35% oil.

6. A product as set forth in claim 5 wherein the alkyd resin has a viscosity of about 6000 mPas or more and the particles have a coating of wax under the polymer network coating and a coating of wax over the polymer network coating.

7. A product as set forth in claim 1 wherein the interpenetrating polymer network coating comprises the reaction products of constituents comprised of in the order of about 20 to 40% isocyanate, 25 to 60% alkyd resin and 5 to 25% oil.

8. A product as set forth in claim 1 wherein the interpenetrating polymer network coating comprises the reaction products of constituents comprised of in the order of about 20 to 40% polyfunctional isocyanate, about 30 to 55% alkyd resin having a viscosity no greater than about 3500 mPas, and about 5 to 20% oil.

9. A product as set forth in claim 1 including an overcoating of wax on the coated particles.

10. A product as set forth in claim 9, wherein the overcoating of wax comprises from about 0.5 to about 2.0% by weight of the coated particles.

11. A product as set forth in claim 1 wherein the interpenetrating polymer network coating comprises from about 2 to about 5% by weight of the coated particles.

12. A process of feeding nutrients to plants comprising the step of applying the product claimed in claim 1 to the soil in which the plants are to grow.

13. A process of feeding nutrients to ruminants comprising the step of incorporating the product claimed in claim 1 in the ruminant feed ration.

14. A process as set forth in claim 13 wherein the product claimed in claim 1 is incorporated in the ration at a rate of ¼ pound or more per day.

15. A controlled release urea-based product comprising particles or granules comprised in whole or in principal part of urea or having urea at or on the exterior surfaces thereof and a moisture resistant interpenetrating polymer network coating on the particles comprised of
   the reaction product of the urea and a polyfunctional isocyanate reactive with the urea, and the reaction products of isocyanate in excess of the amount reacted with the urea, an alkyd resin having at least one double bond in each repeat unit, and an oil having at least one double bond, the coating comprising from about 2% to about 4% by weight of the coated particles and being comprised of from about 20% to about 40% by weight of the isocyanate, from about 30% to about 55% by weight of the alkyd resin and from about 5% to about 20% by weight of the oil.

16. A product as set forth in claim 15, including an overcoating of wax on the coated particles.

17. A method of treating particles comprised in whole or in principal part of urea or having urea at or on the exterior surfaces thereof so as to control the rate of release of the urea, comprising the steps of creating a mobile mass of the particles, heating and/or maintaining the heat of the mobile mass of particles, applying to the heated mobile mass of particles an isocyanate reactive with urea in an amount in excess of that required to react with the urea on the surface of the particles, applying to the isocyanate treated mobile mass of particles a mixture of an alkyd resin having at least one double bond in each repeat unit, an oil having at least one double bond and an initiator for initiating free radical polymerization of the mixture, and continuing to maintain the treated particles in a heated mobile mass for a time sufficient to complete reaction of the isocyanate with the urea, reactions of the isocyanate with the resin and the oil, and polymerization of the resin and the oil, said steps being effective to transform the surface of the treated particles into an interpenetrating polymer network coating that is resistant to moisture so as to release the urea over a controlled period of time.

18. A method as set forth in claim 17 including the step of applying wax to the mobile mass of particles before and/or after applying the isocyanate, alkyd resin and oil.

19. A method as set forth in claim 17 including the step of applying the isocyanate, alkyd resin and oil to the particles at rates of application to comprise from about 2% to about 5% by weight of the coated particles.

20. A method as set forth in claim 17 including the steps of applying the isocyanate, alkyd resin and oil to the particles at respective rates of application in the order of from about 15 to 45% isocyanate, about 20 to about 60% alkyd resin, and about 5 to about 35% oil.

* * * * *